United States Patent [19]
Brand et al.

[11] Patent Number: 5,730,796
[45] Date of Patent: Mar. 24, 1998

[54] DURABLE PIGMENTARY TITANIUM DIOXIDE AND METHODS OF PRODUCING THE SAME

[75] Inventors: John R. Brand, Oklahoma City; Roger A. Baldwin, Warr Acres; Thomas Ian Brownbridge, Oklahoma City, all of Okla.

[73] Assignee: Kerr-McGee Chemical Corporation, Oklahoma City, Okla.

[21] Appl. No.: 786,382

[22] Filed: Jan. 16, 1997

Related U.S. Application Data

[63] Continuation-in-part of Ser. No. 457,923, Jun. 1, 1995, abandoned.

[51] Int. Cl.⁶ .................................................. C09C 1/36
[52] U.S. Cl. .......................... 106/446; 106/439; 106/442
[58] Field of Search .................................. 106/439, 442, 106/446

[56] References Cited

U.S. PATENT DOCUMENTS

| | | | |
|---|---|---|---|
| Re. 32,320 | 12/1986 | Jacobson | 106/439 |
| 2,026,862 | 1/1936 | Blumenfeld et al. | 106/439 |
| 2,211,828 | 8/1940 | Kingsburg et al. | 106/439 |
| 3,203,818 | 8/1965 | Rechmann et al. | 106/439 |
| 3,383,231 | 5/1968 | Allan | 106/430 |
| 3,418,147 | 12/1968 | Fields | 106/442 |
| 3,437,502 | 4/1969 | Werner | 106/442 |
| 3,513,007 | 5/1970 | Lederer | 106/444 |
| 3,515,566 | 6/1970 | Moody et al. | 106/439 |
| 3,522,078 | 7/1970 | May, Jr. et al. | 427/215 |
| 3,522,079 | 7/1970 | Wiseman | 427/215 |
| 3,552,995 | 1/1971 | Powell | 427/215 |
| 3,723,149 | 3/1973 | Cole et al. | 106/439 |
| 3,767,455 | 10/1973 | Claridge et al. | 106/444 |
| 3,804,655 | 4/1974 | Hinley et al. | 106/439 |
| 3,859,109 | 1/1975 | Wiseman et al. | 106/438 |
| 3,942,999 | 3/1976 | Hinley et al. | 106/439 |
| 3,960,589 | 6/1976 | Morrison et al. | 106/439 |
| 4,052,222 | 10/1977 | Howard | 106/438 |
| 4,052,223 | 10/1977 | Howard | 106/438 |
| 4,052,224 | 10/1977 | Howard | 106/438 |
| 4,179,306 | 12/1979 | Woditsch et al. | 106/438 |
| 4,239,548 | 12/1980 | Barnard et al. | 106/439 |
| 4,309,457 | 1/1982 | Kawasumi et al. | 427/216 |
| 4,328,040 | 5/1982 | Panek et al. | 106/438 |
| 4,375,989 | 3/1983 | Makinen | 106/438 |
| 4,405,376 | 9/1983 | Matsunaga et al. | 106/438 |
| 4,447,270 | 5/1984 | Howard et al. | 106/438 |
| 4,447,271 | 5/1984 | Howard et al. | 106/438 |
| 4,450,012 | 5/1984 | Messer et al. | 106/438 |
| 4,460,655 | 7/1984 | Jacobson | 428/530 |
| 4,593,007 | 6/1986 | Novinski | 501/105 |
| 4,737,194 | 4/1988 | Jacobson | 106/439 |
| 4,781,761 | 11/1988 | Jacobson | 106/446 |
| 4,799,963 | 1/1989 | Basil | 106/287 B |
| 5,022,923 | 6/1991 | Rau et al. | 106/417 |

FOREIGN PATENT DOCUMENTS 1023590  3/1966  United Kingdom .

OTHER PUBLICATIONS

Declaration Under 37 CFR 1.175 of Howard Wayne Jacobson appearing in file wrapper for Patent No. Re. 32,320.

*Primary Examiner*—Mark L. Bell
*Assistant Examiner*—Scott L. Hertzog
*Attorney, Agent, or Firm*—Herbert M. Hanegan; J. Rodgers Lunsford, III

[57] ABSTRACT

Pigmentary titanium dioxide having a high durability when used in paint or the like exposed to solar radiation and methods of producing such pigmentary titanium dioxide are provided. The durable pigmentary titanium dioxide of the invention is comprised of rutile titanium dioxide particles having cerium oxide and dense amorphous silica deposited thereon. The particles preferably also have an outer coating of hydrous alumina deposited thereon.

12 Claims, No Drawings

DURABLE PIGMENTARY TITANIUM DIOXIDE AND METHODS OF PRODUCING THE SAME

CROSS REFERENCE TO RELATED APPLICATION

This application is a continuation-in-part of application Ser. No. 08/457,923, filed Jun. 1, 1995 abandoned.

BACKGROUND OF THE INVENTION

1. Field of the Invention

This invention relates to improved titanium dioxide pigments and their production.

2. Description of the Prior Art

Pigmentary titanium dioxide, particularly rutile titanium dioxide, is utilized in a wide variety of products in which a high degree of durability is required. For example, rutile titanium dioxide pigments are commonly used in paints, plastics, and paper laminates. However, when such products are exposed to ultraviolet radiation, degradation and discoloration of the pigment is accelerated. Thus, there is a need for an improved titanium dioxide pigment having a high durability whereby the effective lives of products including the pigment are extended.

SUMMARY OF THE INVENTION

The present invention meets the need described above and overcomes shortcomings of the prior art by providing pigmentary titanium dioxide having an improved durability, i.e., an improved resistance to photo chemical degradation. The durable pigmentary titanium dioxide of this invention is comprised of rutile titanium dioxide particles which have not been subjected to a second calcination step and which have cerium oxide and dense amorphous silica deposited thereon. The cerium oxide is preferably present on the titanium dioxide particles in an amount in the range of from about 0.01% to about 1.0% by weight of titanium dioxide and the dense amorphous silica is preferably present in an amount in the range of from about 1% to about 8% by weight of titanium dioxide.

The titanium dioxide particles having cerium oxide and dense amorphous silica deposited thereon also preferably include an outer coating of hydrous alumina deposited thereon. The hydrous alumina is preferably present on the particles in an amount in the range of from about 2% to about 4% by weight of titanium dioxide.

The improved highly durable titanium dioxide pigment of this invention is produced by forming an aqueous slurry of rutile titanium dioxide particles and adding a water soluble cerium compound thereto which, on reaction with an acid or alkali, deposits cerium oxide on the titanium dioxide particles. An acid or alkali is added to the slurry to cause the deposit of cerium oxide on the titanium dioxide particles. A water soluble silicate and a mineral acid are next added to the slurry to thereby deposit dense amorphous silica on the titanium dioxide particles. If desired, the deposition order can be revised, i.e., the dense amorphous silica can be deposited first followed by the cerium oxide.

The preferred deposition of an outer coating of hydrous alumina on the titanium dioxide particles having cerium oxide and dense amorphous silica deposited thereon is performed by adding an acid or alkaline aluminum compound to the slurry which, on reaction with an alkali or acid, deposits hydrous alumina on the particles. The alkali or acid is added to the slurry either simultaneously with or after the addition of the aluminum compound.

Thus, it is a general object of the present invention to provide improved highly durable pigmentary titanium dioxide and methods of producing the same.

Other and further objects, features, and advantages of the present invention will be readily apparent to those skilled in the art upon reading the following description of the preferred embodiments.

DESCRIPTION OF THE PREFERRED EMBODIMENTS

The durable pigmentary titanium dioxide of this invention is comprised of particles of rutile titanium dioxide which have not been subjected to a second calcination step and which have at least a partial coating of cerium oxide and a substantially continuous coating of dense amorphous silica deposited thereon. The particles preferably also include an outer coating of hydrous alumina to improve the dispersibility and optical properties of the pigment.

The cerium oxide is preferably present on the titanium dioxide particles in an amount in the range of from about 0.01% to about 1.0% by weight of titanium dioxide, the dense amorphous silica is preferably present on the particles in an amount in the range of from about 1% to about 8% by weight of titanium dioxide and the outer coating of hydrous alumina, when included on the particles, is deposited thereon in an amount, expressed as aluminum oxide, in the range of from about 2% to about 4% by weight of titanium dioxide.

The rutile titanium dioxide particles have not been subjected to a second calcination step and are preferably obtained by the "chloride" process, i.e., by the vapor phase oxidation of titanium tetrachloride, preferably in the presence of about 1.5% by weight of alumina to ensure a high conversion to the rutile crystalline form. Rutile titanium dioxide has a better durability and resistance to photochemical degradation than does the anatase crystalline form of titanium dioxide.

The rutile titanium dioxide particles have cerium oxide deposited thereon in a more preferred amount of in the range of from about 0.02% to about 0.5% by weight of titanium dioxide. It is not necessary that the cerium oxide completely coat each particle, but only that some cerium oxide is deposited on the particle.

The titanium dioxide particles further include a non-porous coating of dense amorphous silica deposited thereon in the general amount given above. A more preferred amount is in the range of from about 1% to about 6% by weight of titanium dioxide.

As mentioned above, it is preferred that the particles including cerium oxide and dense silica have an outer coating of hydrous alumina deposited thereon in the general amount, expressed as aluminum oxide, in the range of from about 2% to about 4% by weight of titanium dioxide. More preferably, the titanium dioxide particles include hydrous alumina in an amount in the range of from about 2.5% to about 3.5% by weight of titanium dioxide.

The above-described durable pigmentary titanium dioxide is produced in accordance with the present invention by first forming an aqueous slurry of rutile titanium dioxide particles. The dispersion of the particles in water can be facilitated by first adding a dispersing agent to the water, e.g., sodium hydroxide and sodium hexametaphosphate, followed by adding the titanium dioxide particles. The dispersion of the particles in water can be facilitated by first adding a dispersing agent to the water, e.g., sodium hydroxide and sodium hexametaphosphate, followed by adding the titanium dioxide particles. If desired, the slurry can be subjected to wet milling using a sand mill followed by screening to remove grit and sand residues.

After the aqueous slurry has been formed, a water soluble cerium compound is added to the slurry which, upon reaction with an acid or an alkali, deposits cerium oxide on the titanium dioxide particles. Examples of acid cerium compounds which can be used are the mineral acid salts of cerium such as cerium sulfate or cerium nitrate. The acid cerium compound used can be caused to deposit cerium oxide by reaction with an alkali such as an alkali metal hydroxide. Alternatively, alkaline cerium salts such as cerium ammonium sulfate or nitrate can be employed which react with an acid, e.g., sulfuric acid, to deposit cerium oxide. Preferably, the water soluble cerium compound is cerium nitrate and the alkali reacted therewith is an aqueous sodium hydroxide solution. The cerium compound used is added to the aqueous slurry in a general amount, expressed as cerium oxide, in the range of from about 0.01% to about 1.0% by weight of titanium dioxide particles in the slurry, more preferably in an amount in the range of from about 0.02% to about 0.5% by weight of titanium dioxide. The acid or alkali used is added to the slurry in an amount sufficient to react with the cerium compound and deposit cerium oxide on the particles.

After the deposit of cerium oxide has been accomplished, a coating of dense silica which is substantially non-porous, amorphous, and continuous over the titanium dioxide particles is applied to the particles. The dense amorphous silica is formed in the aqueous slurry from a solution of water soluble silicate while maintaining the slurry at a pH greater than 9, preferably at a pH in the range of from at least 9 to about 11. The deposition of the dense silica can be accomplished by adding a water soluble silicate to the slurry and adding a mineral acid either simultaneously therewith or subsequently thereto. Preferably, an aqueous solution of a water soluble silicate is added to the slurry while simultaneously adding a mineral acid solution thereto to maintain the pH of the slurry at a level within the range of from at least 9 to about 10.5 whereby dense amorphous silica is deposited on the particles. The aqueous solution of water soluble silicate is preferably a sodium silicate solution and the mineral acid is preferably a sulfuric acid solution. The water soluble silicate is added to the slurry in a general amount, expressed as silica, in the range of from about 1% to about 8% by weight of the titanium dioxide particles in the slurry, more preferably in an amount in the range of from about 1% to about 6% by weight of titanium dioxide. The mineral acid used is added to the slurry in a sufficient amount to maintain the pH at the level mentioned above.

During the deposition of the cerium oxide and dense amorphous silica on the titanium dioxide particles, the aqueous slurry is continuously agitated and maintained at a temperature within the range of from about 60° C. to about 100° C., preferably at about 70° C. Also, while the method as described above indicates that the cerium oxide is deposited on the titanium dioxide particles prior to the dense silica, it is to be understood that the reverse order of deposition can be used, i.e., the coating of dense amorphous silica can be deposited on the particles first followed by the deposition of cerium oxide on the coated particles, or the cerium oxide and the dense silica can be deposited simultaneously.

Following the deposition of the cerium oxide and dense silica on the particles, it is preferred that an outer coating of hydrous alumina is formed on the particles to improve dispersibility and optical properties thereof. This is accomplished by adding an acid or alkaline aluminum compound which, upon reaction with an alkali or acid, respectively, deposits hydrous alumina on the particles. Examples of acid aluminum compounds which can be utilized are aluminum salts of mineral acids, e.g., aluminum sulfate or aluminum nitrate. Examples of alkaline aluminum compounds are alkali metal aluminates, e.g., sodium aluminate. The acid or alkaline aluminum compound is added to the slurry in an amount, expressed as alumina, in the general range of from about 2% to about 4% by weight of titanium dioxide in the slurry, more preferably in the range of from about 2.5% to about 3.5%. The alkali or acid is added in a sufficient amount to cause hydrous alumina to be precipitated on the particles either simultaneously with or subsequently to the addition of the aluminum compound. Preferably, the aluminum compound is sodium aluminate added as an aqueous solution, and the sodium aluminate is simultaneously reacted with an aqueous sulfuric acid solution.

After completion of the deposition of cerium oxide, dense amorphous silica, and, optionally, hydrous alumina on the titanium dioxide particles, the particles are preferably filtered, washed, and dried. If desired, the dried product can be crushed, treated with a conditioning agent such as trimethylolethane and fluid energy milled.

The amounts of and the various reagents which are usable to produce the pigments of the present invention will be readily ascertainable by those skilled in the art, as will the concentrations of the various solutions employed, etc.

The following examples are given to further illustrate the improved titanium dioxide pigments and methods of the present invention.

EXAMPLE 1

Rutile titanium dioxide obtained by the vapor phase oxidation of titanium tetrachloride in the presence of 1.5% by weight of alumina was slurried in water with sufficient sodium hexametaphosphate and sodium hydroxide to give a stable dispersion of 34% solids by weight.

This slurry, after being subjected to wet milling with a sandmill, was diluted to 18.7% solids and screened through a 325 standard mesh screen to remove grit and any sand residues.

A portion of the slurry, 4610 grams, containing the equivalent of 864 grams of titanium dioxide was then placed in a suitable vessel equipped with an agitator and heating source. The temperature was then raised to 70° C. The pH of the dispersion was 9.0.

To this agitated, dispersed slurry was added, over a 10 minute period, a solution of ceric nitrate (33 ml) at a concentration of 260 grams/liter of cerium oxide. After addition of the ceric nitrate, the pH of the dispersion measured 1.0. Following a 10 minute aging period, the pH of the dispersion was raised to 9.4 over a 14 minute period by the addition of 144.7 ml of sodium hydroxide solution (110 grams/liter).

The dispersion was allowed to age for 15 minutes. 240.3 ml of a solution of sodium silicate containing the equivalent of 142.8 grams/liter of silica at a silica:sodium oxide ratio of 2.86:1 was then added over a 58 minute period, during which time the pH of the dispersion was held constant at pH 9.4 by concurrent addition of 72.4 ml of 10 volume % sulfuric acid.

Following a 30 minute aging period, the pH was adjusted down to 7.5 by the addition of 26.7 ml of 10 volume % sulfuric acid. The temperature of the dispersion was then lowered from 70° C. to 50° C. and maintained them for the remainder of the process.

A solution of sodium aluminate (201.9 ml) containing 93.5 grams/liter of alumina and 174.4 grams/liter of sodium oxide was then added to the cooled dispersion over a period of 20 minutes. When the pH of the dispersion reached 10.0, 10 volume % sulfuric acid was added concurrently to maintain the pH in the range of 10 to 10.5. A total of 216.9 ml was used. After the addition of the alumina was complete, the dispersion was aged for a period of 79 minutes, during which time the pit decreased from 10.2 to 9.2. The pH was then lowered to 7.5 using 21.6 ml of 10 volume % sulfuric acid. Following a further 30 minute aging period, and a minor pH adjustment to return the pH to 7.5, the slurry was washed to remove soluble salts and then dried at 105° C. The dried product was crushed, treated with a 0.35% trimethylolethane and fluid energy milled.

The photo catalytic activity of the resulting product was measured using the method described, for example, in T. I. Brownbridge and J. R. Brand, *Photocatalytic Activity of Titanium Dioxide Pigment*, Surface Coatings Australia, September 1990, pages 6–11 (paper presented at the 32nd Annual SCAA Convention, Perth, Wash., September 1990). This test basically involves the steps of: (1) placing about 0.2 g of the $TiO_2$ product in about 40 ml of spectroscopic-grade isopropanol; (2) exposing the $TiO_2$/isopropanol composition to ultra-violet light; (3) monitoring the formation of acetone in the test composition over time; (4) determining, by linear regression analysis, a linear rate of acetone formation in the test composition; and (5) multiplying the rate value by $10^3$. The resulting value is proportional to the accelerated weathering performance of $TiO_2$ pigment product.

The inventive pigment product produced in this example was determined to have a photolytic activity value of 0. This result is indicative of a very high degree of durability.

EXAMPLE 2

In this second example, in which no cerium oxide was used, a further portion of rutile titanium dioxide slurry prepared as described in Example 1, consisting of 4615 grams of slurry equivalent to 865 grams of titanium dioxide was used. Using the same vessel as described in Example 1, the slurry was heated to 70° C. The pH was 9.0. A quantity of sodium hydroxide (4.5 ml) was added to raise the pH to 9.4. To this agitated, dispersed slurry was added 242 ml of the same solution of sodium silicate as used in Example 1. This was equivalent to 34.6 grams of silica. The addition of this solution was made over a period of 60 minutes. During this addition, the pH was maintained constant by the concurrent addition of 76.4 ml of 10 volume % sulfuric acid. At the conclusion of the addition, the dispersion was allowed to age for a period of 30 minutes. The pH of the dispersion was then lowered to 7.5 by the addition of 29 ml of 10 volume % sulfuric acid. The temperature of the dispersion was then lowered to 50° C.

203.5 ml of the same sodium aluminate solution as used in Example 1 were then added over a period of 21 minutes. When the pH of the dispersion reached 10.0, 10 volume % sulfuric acid was added concurrently so as to maintain a pH in the range of 10–10.5. After the addition of alumina was complete, the batch was allowed to age for 45 minutes. During this time, the pH increased from 10.3 to 10.4. After this aging period, the pH was lowered to 7.5 by the addition of 106.9 ml of 10 volume % sulfuric acid over a period of 30 minutes. After 30 minutes of aging and a minor pH adjustment to return the pH to 7.5, the batch was filtered, washed, and dried at 105° C. The dried product was crushed and treated with a 0.35% trimethylolethane and fluid energy milled. The photocatalytic activity of this sample was 1.0, which was poorer than the cerium oxide treated sample prepared in Example 1.

EXAMPLE 3

In this third example, the beneficial effect of even lower levels of $CeO_2$ was demonstrated. 836 grams of rutile titanium dioxide slurry prepared as previously described, but at a slurry concentration of 30% solids or 1.3 specific gravity, was heated to 80° C. The pH of the dispersion was 9.0. The pH was raised to 10.0 by the addition of 9.5 ml of sodium hydroxide. To the heated dispersion was added 1.6 ml of the same solution of ceric nitrate as used in Example 1. The addition time was one minute. The pH was maintained constant by the concurrent addition of 4.1 ml of 200 grams/liter sodium hydroxide solution. The dispersion was aged for a 15 minute period. The pH of the dispersion was then reduced to 9.4 by the addition of 0.4 ml of 95 weight % sulfuric acid.

154.8 ml of a solution of sodium silicate at a concentration of 216 grams/liter silica and with a silica:sodium oxide ratio of 3.22 was then added over a 121 minute period. During this time, the pH was maintained constant by the addition of 7.2 ml of 95 weight % sulfuric acid. On completion of the silica precipitation, the dispersion was aged for 15 minutes. The pH was then lowered to 8.0 by adding 2.1 ml of 95 weight % sulfuric acid.

73.6 ml of sodium aluminate solution at 250 grams/liter of alumina was added over a period for 20 minutes. During the sodium aluminate addition, the pH was maintained constant at 8.0 by the concurrent addition of 19.3 ml of 95 weight % sulfuric acid. The pH of the dispersion was then reduced to 5.6 and the dispersion was allowed to age for 15 minutes. After a further minor adjustment in pH to return the pH to 5.6, the batch was filtered, washed, and dried at 105° C.

The dry product was then crushed, treated with 0.35% trimethylolethane, and fluid energy milled. The photocatalytic activity of this sample was measured at 0.47 which was better than the value obtained in Example 2.

EXAMPLE 4

In a further example in which no cerium oxide was used in conjunction with dense silica, 824 grams of futile titanium dioxide prepared as described in Example 1, but at a solids concentration of 30% and a specific gravity of 1.3, was heated to a temperature of 80° C. After addition of 2.9 ml of sodium hydroxide solution, the pH was raised to 9.4.

To the dispersion was added 152.6 ml of sodium silicate, the same as described in Example 3, over a period of 120 minutes. During this time, the pH was maintained constant by the concurrent addition of 7.0 ml of 95 weight % sulfuric acid. Following the silica addition, the dispersion was allowed to age for 15 minutes. The pH was then lowered to 8.0 by the addition of 2.0 ml of 95 weight % sulfuric acid.

72.5 ml of the same solution of sodium aluminate as used in Example 3 was then added over a 20 minute period. During this time, the pH was maintained constant by the concurrent addition of 16.0 ml of 95 weight % sulfuric acid. At the conclusion of the sodium aluminate addition, the pH was lowered to 5.6 using 1.5 ml of 95 weight % sulfuric acid. After a 15 minute aging period and a further minor adjustment in pH, the batch was filtered, washed, and dried at 105° C. The dried product was then crushed, treated with 0.35% trimethylolethane, and fluid energy milled.

The photocatalytic activity of this sample was measured at 1.16 which was equivalent to the value obtained for the pigment from Example 2, but poorer than pigments from Examples 1 and 3.

EXAMPLE 5

In this example, cerium oxide was deposited after the dense silica had been deposited. 838 grams of titanium dioxide as described in Example 1, but at a solids concentration of 30% and a specific gravity of 1.3, were placed in the treatment vessel and the temperature was raised to 80° C. Following the addition of 3.2 ml of 200 grams/liter sodium hydroxide solution, the pH was raised to 9.4.

To this dispersion was added 155.2 ml of the same solution of sodium silicate as used in Example 3 over a period of 120 minutes. During the addition, the pH was maintained constant by the concurrent addition of 7.2 ml of 95 weight % sulfuric acid. After the silica addition was complete, the slurry was allowed to age for 15 minutes.

6.4 ml of the same solution of ceric nitrate as used previously was then added over a 3.5 minute period, during which time the pH was maintained constant at 9.4 by concurrent addition of 13 ml of 200 grams/liter sodium hydroxide solution. The dispersion was then aged for a period of 15 minutes, after which the pH was lowered to 8.0 by the addition of 1.7 ml of 95 weight % sulfuric acid.

Sodium aluminate (73.7 ml), which was the same as used in Example 3, was then added to the slurry over a 21 minute period. During this time, the pH was maintained constant at pH 8.0 by the concurrent addition of 16.1 ml of 95 weight % sulfuric acid. At the completion of the alumina addition, the pH was lowered to 5.6 by the addition of 1.8 ml of 95 weight % sulfuric acid and allowed to age for 15 minutes.

After the aging period and a minor adjustment in pH, the product was filtered, washed, and dried at 105° C. The dry pigment was crushed and treated with 0.35% trimethylolethane and then fluid energy milled. The photocatalytic activity of this sample was measured at 0.13.

The test results set forth in Examples 1–5 above are summarized in the following table.

| Example No. | Deposited Compounds % by Wt. TiO$_2$ | | | Order of CeO$_2$ Deposition | Photocatalytic Activity Measurement |
|---|---|---|---|---|---|
| | SiO$_2$ | CeO$_2$ | Al$_2$O$_3$ | | |
| 1 | 4.0 | 1.0 | 2.2 | Before SiO$_2$ | 0 |
| 2 | 4.0 | — | 2.2 | — | 1.0 |
| 3 | 4.0 | 0.05 | 2.2 | Before SiO$_2$ | 0.47 |
| 4 | 4.0 | — | 2.2 | — | 1.16 |
| 5 | 4.0 | 0.2 | 2.2 | After SiO$_2$ | 0.13 |

From the foregoing examples and the above table, it can be seen that the pigmentary titanium dioxide of the present invention has low photocatalytic activity, and, therefore, high durability.

Thus, the present invention is well adapted to carry out the objects and attain the ends and advantages mentioned as well as those which are inherent therein. While numerous changes in the invention may be made by those skilled in the art, such changes are encompassed within the spirit of this invention as defined by the appended claims.

What is claimed is:

1. Durable pigmentary titanium dioxide comprising particles of rutile titanium dioxide having at least a partial coating of cerium oxide and a substantially continuous coating of dense amorphous silica deposited thereon, said cerium oxide being present in an amount in the range of from about 0.02% to about 0.5% by weight of titanium dioxide and said dense amorphous silica being present in an amount in the range of from about 1% to about 8% by weight of titanium dioxide, said coating of dense amorphous silica having been deposited on said particles of rutile titanium dioxide by a process wherein a water soluble silicate and a mineral acid are added to an aqueous slurry of said particles of rutile titanium dioxide and wherein, during the deposition of said dense amorphous silica on said particles of rutile titanium dioxide, said slurry is maintained at a pH in the range of from at least 9 to about 11 and at a temperature in the range of from about 60° C. to about 100° C. and wherein said particles have an outer coating of hydrous alumina deposited over both said at least partial coating of cerium oxide and said substantially continuous coating of dense amorphous silica in an amount, expressed as aluminum oxide, in the range of from about 2% to about 4% by weight of titanium dioxide, said durable pigmentary titanium dioxide being formed without a second calcination step.

2. Durable pigmentary titanium dioxide comprising particles of rutile titanium dioxide having at least a partial coating of cerium oxide, a substantially continuous coating of dense amorphous silica and an outer coating of hydrous alumina deposited thereon, said outer coating of hydrous alumina being deposited over both said at least partial coating of cerium oxide and said substantially continuous coating of dense amorphous silica, said dense amorphous silica having been deposited on said particles of rutile titanium dioxide by a process wherein a water soluble silicate and a mineral acid are added to an aqueous slurry of said particles of rutile titanium dioxide and wherein, during the deposition of said dense amorphous silica on said particles of rutile titanium dioxide, said slurry is maintained at a pH in the range of from at least 9 to about 11 and at a temperature in the range of from about 60° C. to about 100° C., said cerium oxide being present in an amount in the range of from about 0.02% to about 0.5% by weight of titanium dioxide, said dense amorphous silica being present in an amount in the range of from about 1% to about 6% by weight of titanium dioxide and said hydrous alumina being present in an amount in the range of from about 2.5% to about 3.5% by weight of titanium dioxide and wherein said outer coating of hydrous alumina is in an amount, expressed as aluminum oxide, in the range of from about 2% to about 4% by weight of titanium dioxide said durable pigmentary titanium dioxide being formed without a second calcination step.

3. A method of producing durable pigmentary titanium dioxide comprising the steps of:

(a) adding to an aqueous slurry of rutile titanium dioxide particles a water soluble cerium compound which on reaction with an acid or alkali deposits cerium oxide on said titanium dioxide particles, said cerium compound being added in an amount expressed as cerium oxide in the range of from about 0.02% to about 0.5% by weight of titanium dioxide in said slurry;

(b) adding an alkali to said slurry in an effective amount for reacting with said cerium compound and depositing at least a partial coating of cerium oxide on said titanium dioxide particles;

(c) adding a water soluble silicate and a mineral acid to said slurry to thereby deposit a substantially continuous coating of dense amorphous silica on said titanium dioxide particles, said water soluble silicate being added in an amount, expressed as silica, in the range of from about 1% to about 6% by weight of titanium dioxide in said slurry; and (d) forming an outer coating of hydrous alumina on said titanium dioxide particles by adding an acid or alkaline aluminum compound which on reaction with an alkali or acid, respectively, deposits hydrous alumina on said titanium dioxide particles, and adding said alkali or acid in an effective amount for causing said deposit of hydrous alumina, said aluminum compound being added in an amount, expressed as alumina, in the range of from about 2% to about 4% by weight of titanium dioxide in said slurry;

wherein, throughout step (c), said slurry is maintained at a pH in the range of from at least 9 to about 11 and at a temperature in the range of from about 60° C. to about 100° C. said durable pigmentary titanium dioxide being formed without a second calcination step.

4. The method of claim 3 wherein said water soluble cerium compound added in accordance with step (a) is cerium nitrate.

5. The method of claim 4 wherein said acid or alkali added in accordance with step (b) is an aqueous sodium hydroxide solution.

6. The method of claim 5 wherein said water soluble silicate and said mineral acid added in accordance with step (c) are an aqueous solution of sodium silicate and an aqueous sulfuric acid solution, respectively.

7. The method of claim 3 wherein the outer coating of hydrous alumina on said titanium dioxide particles is formed by adding an aqueous solution of sodium aluminate to said slurry and adding an effective amount of an aqueous solution of sulfuric acid to said slurry for reacting with said sodium aluminate and causing said outer coating of hydrous alumina to be deposited on said titanium dioxide particles, said aqueous solution of sodium aluminate being added in an amount expressed as alumina in the range of from about 2.5% to about 3.5% by weight of titanium dioxide in said slurry.

8. The method of claim 7 which is further characterized to include filtering, washing, and drying the resulting titanium dioxide particles.

9. The method of claim 3 wherein step (c) is performed prior to steps (a) and (b).

10. The method of claim 3 wherein the outer coating of hydrous alumina on said titanium dioxide particles is formed by adding an acid or alkaline aluminum compound which on reaction with an alkali or acid, respectively, deposits hydrous alumina on said titanium dioxide particles, and adding said alkali or acid in an effective amount for causing said deposit of hydrous alumina, said aluminum compound being added in an amount, expressed as alumina, in the range of from about 2% to about 4% by weight of titanium dioxide in said slurry.

11. The method of claim 10 wherein said acid or alkaline aluminum compound is an aqueous solution of sodium aluminate, and said alkali or acid is an aqueous sulfuric acid solution.

12. The method of claim 11 wherein said aluminum compound is added in an amount, expressed as alumina, in the range of from about 2.5% to about 3.5% by weight of titanium dioxide in said slurry.

* * * * *